US010954005B1

United States Patent
Lord et al.

(10) Patent No.: US 10,954,005 B1
(45) Date of Patent: Mar. 23, 2021

(54) POWER TRAIN FOR DEEP SPACE SOLAR ELECTRIC PROPULSION

(71) Applicants: Space Systems/Loral, LLC, Palo Alto, CA (US); California Institute of Technology, Pasadena, CA (US)

(72) Inventors: Peter Warner Lord, San Jose, CA (US); Gregory Alan Carr, Agua Dulce, CA (US); Jorge Delgado, San Jose, CA (US); Dan Michael Goebel, Tarzana, CA (US); Bao Hoang, San Francisco, CA (US); David Younghee Oh, La Canada, CA (US); Lee Charles Rotlisberger, San Jose, CA (US); Christopher Bryan Stell, Valencia, CA (US); Denis Trofimov, Palo Alto, CA (US)

(73) Assignees: Space Systems/Loral, LLC, Palo Alto, CA (US); California Institute of Technology, Pasadena, CA (US)

( * ) Notice: Subject to any disclaimer, the term of this patent is extended or adjusted under 35 U.S.C. 154(b) by 878 days.

(21) Appl. No.: 15/659,395

(22) Filed: Jul. 25, 2017

Related U.S. Application Data

(60) Provisional application No. 62/366,481, filed on Jul. 25, 2016.

(51) Int. Cl.
  *H01M 10/44* (2006.01)
  *B64G 1/40* (2006.01)
  (Continued)

(52) U.S. Cl.
  CPC ............ *B64G 1/405* (2013.01); *B64G 1/443* (2013.01); *G05F 1/67* (2013.01)

(58) Field of Classification Search
  CPC ............ B64G 1/405; B64G 1/443; G05F 1/67
  See application file for complete search history.

(56) References Cited

U.S. PATENT DOCUMENTS

| 6,262,558 B1 | 7/2001 | Weinberg |
| 6,429,368 B1 * | 8/2002 | Summers ............... H02S 30/20 |
|  |  | 136/244 |

(Continued)

FOREIGN PATENT DOCUMENTS

| EP | 0 949 144 A2 | 10/1999 |
| FR | 2850212 A1 | 7/2004 |
| WO | WO 94/15834 | 7/1994 |

OTHER PUBLICATIONS

Brophy, et al., "Dawn: An Ion-Propelled Journey to the Beginning of the Solar System", IEEEAC paper #1504, 2008, 10 pages.

(Continued)

*Primary Examiner* — Arun C Williams
(74) *Attorney, Agent, or Firm* — Weaver Austin Villeneuve & Sampson LLP

(57) ABSTRACT

A spacecraft includes a power train that includes a solar array, an electric propulsion subsystem, and a power conversion module. The power conversion module receives power from the solar array at a voltage, $V_i$; and delivers power to the electric propulsion subsystem at a voltage, $V_o$. The spacecraft is configured to operate at a varying distance, D, from the sun within the range of $D_{min}$ to $D_{max}$, $D_{max}$ being at least $1.3 \times D_{min}$. The solar array is configured to deliver power to the power conversion module at a voltage approximately equal to $V_o$ when the spacecraft is proximate to $D_{max}$.

20 Claims, 3 Drawing Sheets

(51) Int. Cl.
*G05F 1/67* (2006.01)
*B64G 1/44* (2006.01)

(56) References Cited

U.S. PATENT DOCUMENTS

| | | | |
|---|---|---|---|
| 8,550,405 B2 | 10/2013 | Hruby et al. | |
| 10,005,367 B2* | 6/2018 | Lee | B60L 53/12 |
| 10,097,131 B2* | 10/2018 | Momayez | H02S 10/40 |
| 10,573,799 B2* | 2/2020 | Makosinski | A47G 19/2227 |
| 2008/0053716 A1* | 3/2008 | Scheucher | H02J 7/0045 |
| | | | 180/2.1 |
| 2010/0108819 A1* | 5/2010 | Kawaguchi | B64G 1/26 |
| | | | 244/158.5 |
| 2011/0073714 A1 | 3/2011 | Hruby et al. | |
| 2012/0268074 A1* | 10/2012 | Cooley | H01G 11/08 |
| | | | 320/130 |
| 2015/0021439 A1* | 1/2015 | Duchemin | B64G 1/24 |
| | | | 244/171.1 |
| 2015/0021442 A1* | 1/2015 | Hunter | H01L 31/0547 |
| | | | 244/53 R |
| 2015/0330367 A1* | 11/2015 | Homsy | F16C 35/12 |
| | | | 416/244 A |
| 2016/0325819 A1* | 11/2016 | Park | B64C 3/26 |
| 2019/0283906 A1* | 9/2019 | Imajyo | B64G 1/10 |
| 2020/0102100 A1* | 4/2020 | Lozano | B64G 1/405 |

OTHER PUBLICATIONS

Oh, et al., "Solar Electric Propulsion for Discovery Class Missions", IEPC-2013-124, 2013, 26 pages.

* cited by examiner

POWER TRAIN FOR DEEP SPACE SOLAR ELECTRIC PROPULSION

CROSS-REFERENCE TO RELATED APPLICATIONS

This disclosure claims priority to U.S. Provisional Patent Application No. 62/366,481, filed Jul. 25, 2016, entitled "POWER TRAIN FOR DEEP SPACE SOLAR ELECTRIC PROPULSION", the disclosure of which is hereby incorporated by reference in its entirety into this Patent Application for all purposes.

STATEMENT REGARDING FEDERALLY FUNDED RESEARCH OR DEVELOPMENT

The invention described herein was made in the performance of work under NASA contract NNN12AA01C, and is subject to the provisions of Public Law 96-517 (35 USC 202) in which the Contractor has elected to retain title.

TECHNICAL FIELD

The present disclosure relates generally to a spacecraft power train including an electric propulsion system, and particularly to a power train suitable for deep space missions that include operation at distances from the sun that vary over a substantial range.

BACKGROUND

Deep space missions include operation over a wide range of distances from the sun. For a typical deep space mission, a spacecraft may travel from Earth's orbit, at one astronomical unit (AU) from the sun, toward astronomical objects orbiting the sun at distances substantially different from the Earth (e.g., 0.3-3 AU). Cost effectiveness of such missions may be improved by using, where possible, commercially developed satellite hardware that is typically optimized for use in Earth orbit. For example, solar powered electric propulsion subsystems for orbit transfer and orbit maintenance of Earth-orbiting spacecraft, now widely used for commercial spacecraft, may be advantageously adapted for use on spacecraft configured for deep space missions.

Adapting such a commercially available electric propulsion subsystem (EPS) to such deep space spacecraft may require the EPS to accommodate operation at a wide range of power levels as a result of solar intensity variations experienced by the spacecraft over the course of the mission. For example, in a mission to the asteroid 16 Psyche, the solar flux during mission phases near the asteroid (at about 3.3 AU) will be roughly 10% of that near Earth. In addition, because solar array voltage varies inversely with temperature, the operating voltage of the solar array at 3.3 AU is expected to be substantially higher (about 1.75 times higher) than at 1 AU. To preserve the heritage of commercially qualified SEP subsystems, however, the power train of the spacecraft may be required to include a power converter that supplies power to the EPS at a relatively constant voltage of about 100V.

An improved power train design that increases power conversion efficiency during phases of the mission when solar flux (and, as a result, solar array power) is near minimum is desirable.

SUMMARY

According to some implementations, a spacecraft power train includes a solar array, an electric propulsion subsystem, and a power conversion module that receives power from the solar array at a voltage, $V_i$; and delivers power to the electric propulsion subsystem at a voltage, $V_o$. The spacecraft power train is configured to operate at a varying distance, D, from the sun within the range of $D_{min}$ to $D_{max}$, $D_{max}$ being at least $1.3 \times D_{min}$. The solar array is configured to deliver power to the power conversion module at a voltage approximately equal to $V_o$ when the spacecraft is proximate to $D_{max}$.

In some examples, the electric propulsion subsystem may be configured to operate with power regulated to $V_{nom}$+/− approximately 10%. The solar array may be configured to deliver power to the power conversion module such that $V_i$ varies, as a function of D, between a maximum of $V_o$ and a minimum less than $V_o/2$. The power conversion module may be configured to deliver power to the electric propulsion subsystem at the voltage $V_o$, such that $V_o$ is not less than $V_{nom}/1.1$ and not greater than $1.1 * V_{nom}$. In some examples, the solar array may be configured to deliver power to the power conversion module at a voltage approximately substantially less than $V_{nom}$ when the spacecraft is proximate to $D_{min}$.

In some examples, the power conversion module may include a boost converter with switching circuitry and an output diode. In some examples, the switching circuitry of the boost converter may become inactive and exhibit negligible power loss when $V_i \geq V_{nom}$.

In some examples, the power conversion module efficiency may be about 99% when the solar array delivers power to the power conversion module at a voltage approximately equal to $V_o$.

In some examples, the power conversion module efficiency may be about 99% when the spacecraft is at a distance from the sun of $0.9 \, D_{max}$ or greater.

In some examples, the electric propulsion subsystem includes an electric thruster configured to operate at a power ranging between a minimum power $P_{min}$ and a maximum power $P_{max}$, $P_{max}$ being at least $5 \times P_{min}$ of 800 to 4500 watts.

According to some implementations, a spacecraft includes a power train that includes a solar array, an electric propulsion subsystem, and a power conversion module. The power conversion module receives power from the solar array at a voltage, $V_i$; and delivers power to the electric propulsion subsystem at a voltage, $V_o$. The spacecraft is configured to operate at a varying distance, D, from the sun within the range of $D_{min}$ to $D_{max}$, $D_{max}$ being at least $1.3 \times D_{min}$. The solar array is configured to deliver power to the power conversion module at a voltage approximately equal to $V_o$ when the spacecraft is proximate to $D_{max}$.

In some examples, the electric propulsion subsystem may be configured to operate with power regulated to $V_{nom}$+/− approximately 10%. The solar array may be configured to deliver power to the power conversion module such that $V_i$ varies, as a function of D, between a maximum of $V_o$ and a minimum less than $V_o/2$. The power conversion module may be configured to deliver power to the electric propulsion subsystem at the voltage $V_o$, such that $V_o$ is not less than $V_{nom}/1.1$ and not greater than $1.1 * V_{nom}$. In some examples, the solar array may be configured to deliver power to the power conversion module at a voltage approximately substantially less than $V_{nom}$ when the spacecraft is proximate to $D_{min}$.

In some examples, the power conversion module may include a boost converter and an output diode.

In some examples, the electric propulsion subsystem may include an electric thruster configured to operate at a power ranging between a minimum power $P_{min}$ and a maximum power $P_{max}$, $P_{max}$ being at least $5 \times P_{min}$ of 800 to 4500 watts.

According to some implementations, a method includes disposing a spacecraft in a first orbit, the spacecraft while in the first orbit being at an approximate distance, $D_1$, from the sun, transferring the spacecraft to a second orbit, the spacecraft while in the second orbit being at an approximate distance, $D_2$, from the sun, $D_2$ differing from $D_1$ by a least a factor of two. The spacecraft includes a power train that includes a solar array, an electric propulsion subsystem, and a power conversion module. The power conversion module receives power from the solar array at a voltage, $V_i$; and delivers power to the electric propulsion subsystem at a voltage, $V_o$. The spacecraft is configured to operate at a varying distance, D, from the sun within the range of $D_{min}$ to $D_{max}$, $D_{max}$ being at least $1.3 \times D_{min}$. The solar array is configured to deliver power to the power conversion module at a voltage approximately equal to $V_o$ when the spacecraft is proximate to $D_{max}$.

In some examples, the electric propulsion subsystem may be configured to operate with power regulated to $V_{nom}$ +/- approximately 10%. The solar array may be configured to deliver power to the power conversion module such that $V_i$ varies, as a function of D, between a maximum of $V_o$ and a minimum less than $V_o/2$. The power conversion module may be configured to deliver power to the electric propulsion subsystem at the voltage $V_o$, such that $V_o$ is not less than $V_{nom}/1.1$ and not greater than $1.1 \ast V_{nom}$. In some examples, the solar array is configured to deliver power to the power conversion module at a voltage approximately substantially less than $V_{nom}$ when the spacecraft is proximate to $D_{min}$.

In some examples, the power conversion module may include a boost converter and an output diode.

In some examples, the electric propulsion subsystem may include an electric thruster configured to operate at a power ranging between a minimum power $P_{min}$ and a maximum power $P_{max}$, $P_{max}$ being at least $5 \times P_{min}$ of 800 to 4500 watts.

In some examples, $D_1$ may be approximately equal to $D_{min}$ and $D_2$ may be approximately equal to $D_{max}$.

In some examples, $D_1$ may be approximately equal to $D_{max}$ and $D_2$ may be approximately equal to $D_{min}$.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Figure 1:
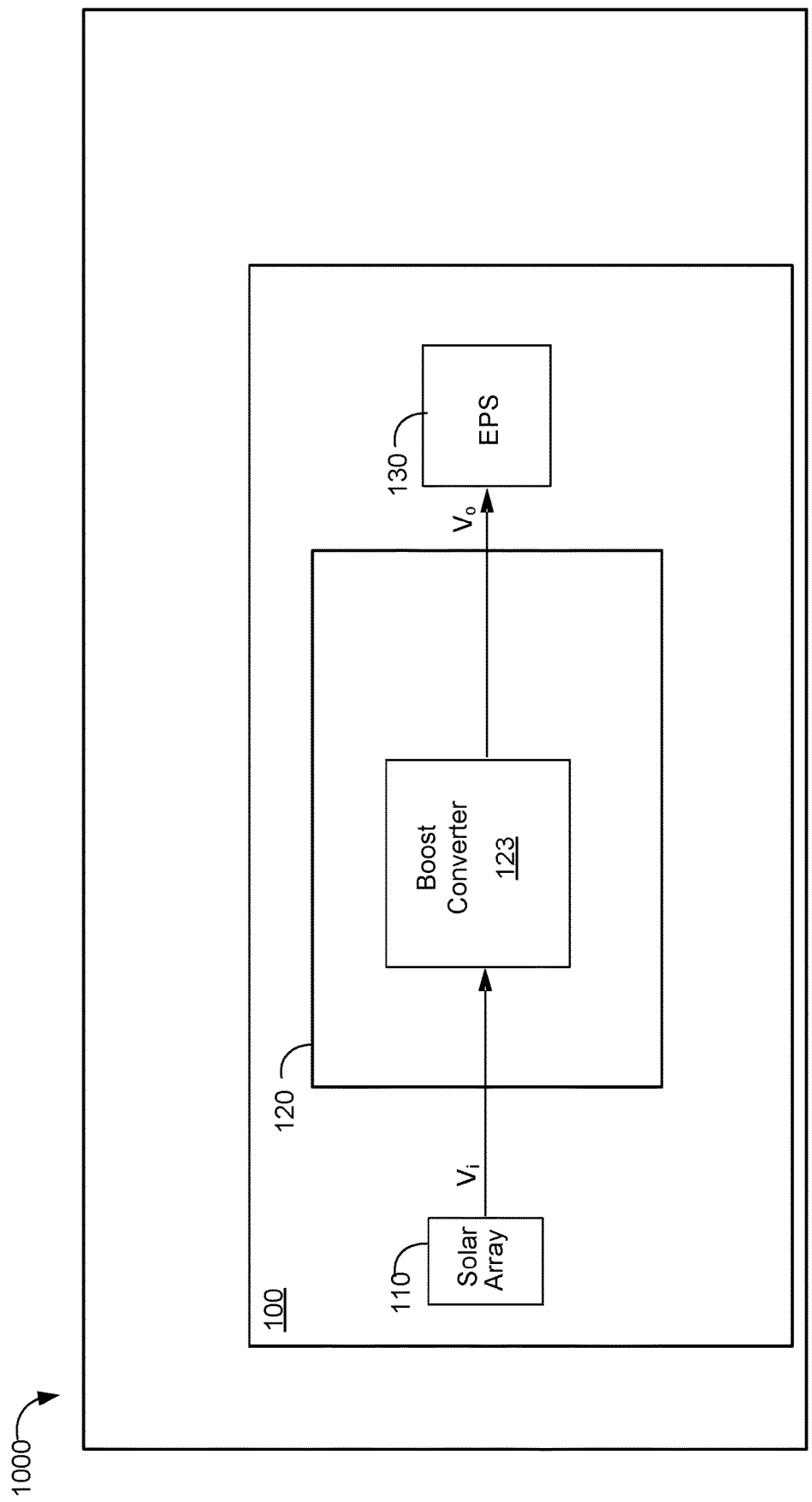
FIG. 1 illustrates a block diagram of a deep space spacecraft, according to an implementation.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The present inventors have developed an improved power system architecture ("power train") tailored for a deep space spacecraft. The power train is operable over a wide range of distances from the sun. In some implementations, the power train is configured to power an EPS including, for example, a Hall Effect Thruster (HET) or thrusters. The power train includes a power converter configured to receive input power from a solar array and provide an output power to the EPS at a desired bus voltage range (e.g., 100+/−10V). In some implementations, the power converter is configured to operate at peak efficiency during critical low power phases of the mission (near the maximum distance from the Sun where the least power is available).

One aspect of the presently disclosed techniques involves the selection of a solar array configuration, more particularly, solar cell string length, such that the solar array has an output voltage that is substantially lower than the desired bus voltage during phases of the mission when the spacecraft is relatively close to the sun. For a mission to an outer planet or asteroid for example, solar radiant flux and array output power is relatively high near the beginning of mission when the spacecraft is near or less than 1 AU away from the sun). In accordance with the present disclosure, the solar array may be configured to provide an output voltage well below the bus voltage during this mission phase. The power converter may include a boost converter that boosts the array output voltage to the desired regulated bus voltage (e.g., 100+/−10V). Power output from the power converter is in turn distributed to the EPS. Because excess power is available during mission phases when the spacecraft is relatively close to the sun, power conversion losses, typically 5% for a boost converter, including a 4% switching loss and a 1% power drop through an output diode, may be more easily tolerated during these mission phases.

Over the course of a mission, as the spacecraft follows a trajectory away from the sun, the solar cells become cooler. As a result, the optimal solar array voltage for generating the maximum (or peak) power increases. Advantageously, the solar array may be configured with a solar cell string length selected such that the array's peak power producing voltage slightly exceeds the desired regulated bus voltage during mission phases where the spacecraft is near the maximum distance from the sun (taking into account solar array degradation and low intensity illumination effects). For example, where a deep space mission contemplates operation at a distance from the sun ranging between 1 AU and 3.3 AU, and the desired regulated bus voltage is 100 V, the solar array may be configured with a solar cell string length selected so as to provide an output voltage, at 1 AU, of 60V. At 3.3 AU, such a solar array may be expected to output peak power at about 1.75 times higher voltage than at 1 AU, that is, about 105V.

When the solar array voltage output is at or above 100V (at about 3 AU for an array outputting 60V at 1 AU), the boost converter switching circuitry becomes inactive, the output power is effectively unregulated, and the power converter efficiency may be approximately 99%, because the only loss experienced is an approximately 1% loss associated with the output diode. Thus, power converter efficiency during the critical phase of the mission where power is most limited is improved from 95% to 99%.

FIG. 1 illustrates a block diagram of a deep space spacecraft, according to an implementation. In the illustrated implementation, a spacecraft 1000 includes a power train 100 that includes a solar array 110, a power conversion module 120, and an electric propulsion subsystem (EPS) 130. The spacecraft 1000 may include a payload (not illustrated), including one or more scientific instruments, for example, and subsystems for telemetry and command, attitude and thermal control, etc.

The solar array 110 may include conventional flight qualified solar cells as used for commercial earth orbiting spacecraft. However, whereas a conventional solar array, suitable for a power bus configured for operation at a regulated voltage $V_{reg}$, may include strings of cells, each string sized to deliver at 1 AU, a voltage slightly higher than $V_{reg}$, an array according to the present disclosure may include strings that deliver power, at 1 AU, at a voltage substantially less than $V_{reg}$.

For example, where a deep space mission contemplates a spacecraft travelling from a minimum distance to the sun of 1 AU to a maximum distance of 3.3 AU, and $V_{reg}$ is 100V, the solar array 110 may be designed to provide power to the power conversion module 120, during mission phases near the minimum distance, at a voltage, $V_i$, of 60V. The solar array 110, consequently, may provide power to the power conversion module 120, during mission phases near the maximum distance, at a voltage, $V_i$, of about 105V (i.e., 1.75×60V).

The power conversion module 120 may include a boost converter 123 with switching circuitry and an output diode (not illustrated). When the switching circuitry of boost converter 123 is active (i.e., the solar array is outputting power at less than 100V), the net efficiency of the power conversion module 120 may be approximately 95%, including losses associated with the output diode. The output of the power conversion module 120 may be at a regulated $V_o$=100V.

During mission phases at or near the maximum distance, the solar array voltage is expected to rise to or above $V_i$=100V. When $V_i$ is at or above 100V, the switching circuitry of the boost converter 123 may become inactive and exhibit negligible power loss. Because the power conversion "boost" stage is no longer needed boost stage conversion losses are effectively eliminated, and the only power loss in the power conversion module 120 is a result of losses associated with the output diode. Such losses have been found to be about 1%. Consequently, the overall efficiency of the power conversion module 120 is expected to be about 99% during mission phases near the maximum distance. It will be appreciated that power conversion efficiency is most critical during mission phases farthest from the sun, so the disclosed technique provides important benefits for these mission phases.

It will be appreciated that when solar output voltage exceeds 100V, the power delivered to the EPS 130 will also exceed 100V. Heritage equipment intended to be operated from a regulated 100V bus are generally required to operate normally within a range of 90-110V. Thus, a planned mission phase in which an unregulated voltage in the range of 100-110V is provided to this equipment may constitute very little mission risk.

The EPS 130 may include one or more electric thrusters. An electric thruster, as contemplated by the present disclosure, may be or include, for example, a Hall accelerator, a gridded electrostatic accelerator, a cross field (E×B) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle. In some implementations, the electric thruster may be Hall Effect thrusters (HET) such as a stationary plasma thruster (SPT). In some implementations the electric thruster may be an SPT with a nominal full power rating of 4500 watts, such as the SPT-140 manufactured by OKB Fakel of Kaliningrad, Russia, for example. Although the SPT-140 achieves highest efficiency at 4.5 KW, it is operable over a wide range of powers. For a contemplated deep space mission travelling between 1 AU and 3 AU from the sun, the SPT-140 may be operated at full power when the spacecraft is at or below 1 AU and at gradually reduced power as the spacecraft travels toward 3 AU. At a maximum distance from the sun, for a mission to the asteroid 16 Psyche, the SPT-140 may be operated, when approaching that maximum distance, at a power as low as about 800 W.

For a contemplated deep space mission to an inner planet, the solar array may be configured to provide power, during mission phases near the maximum distance from the sun (about 1 AU), at a voltage, $V_i$, of about 105V. For such a mission, the minimum power condition occurs in mission phases near earth's orbit, during which phases the output power of the power conversion module may be effectively unregulated, and the power converter efficiency may be approximately 99%. As the spacecraft follows a trajectory nearer to the sun, the solar cells become warmer. As a result, the optimal solar array voltage for generating the maximum (or peak) power decreases and the power conversion boost stage becomes active, so as to provide a regulated voltage output to the EPS.

Figure 2:
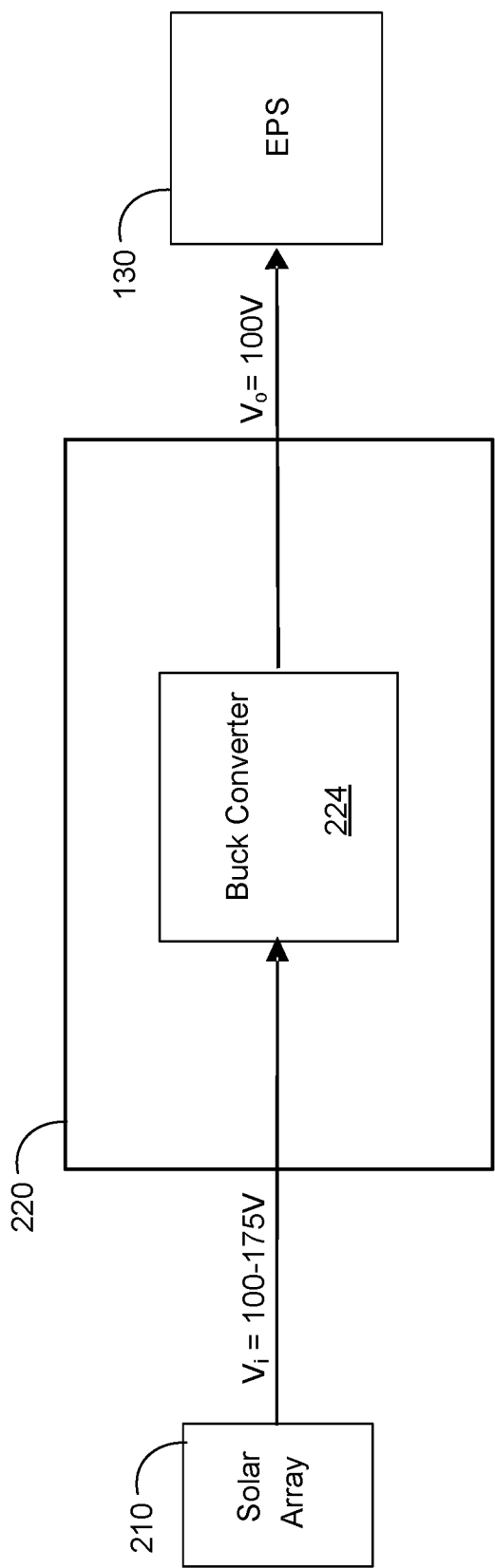
FIG. 2 illustrates a power train for providing a regulated 100V output to an EPS in the absence of the presently disclosed techniques.

Features and benefits of the present invention may be better appreciated by considering FIG. 2, which illustrates a power train for providing a regulated 100V output to the EPS 130 in the absence of the presently disclosed techniques. A conventionally configured solar array 210 includes solar cell strings that deliver, at 1 AU distance from the sun, a peak power at a voltage of about 100V. During mission phases when the spacecraft is substantially more distant from the sun, the peak power voltage is greater. For example, at 3.3 AU from the sun, the peak power voltage is 175V. Accordingly, power received by power conversion module 220 may be at a voltage $V_i$ in the range of 100-175V. The power conversion module 220 includes a buck converter 224 that may be expected to exhibit a constant power conversion efficiency of about 96%. In combination with an output diode (not illustrated), a net power converter efficiency of 95% may be expected. Compared to the presently disclosed techniques, the power train illustrated in FIG. 2 is at least 4% less efficient during the critical low power phase of the mission than the power train described above in connection with FIG. 1.

Figure 3:
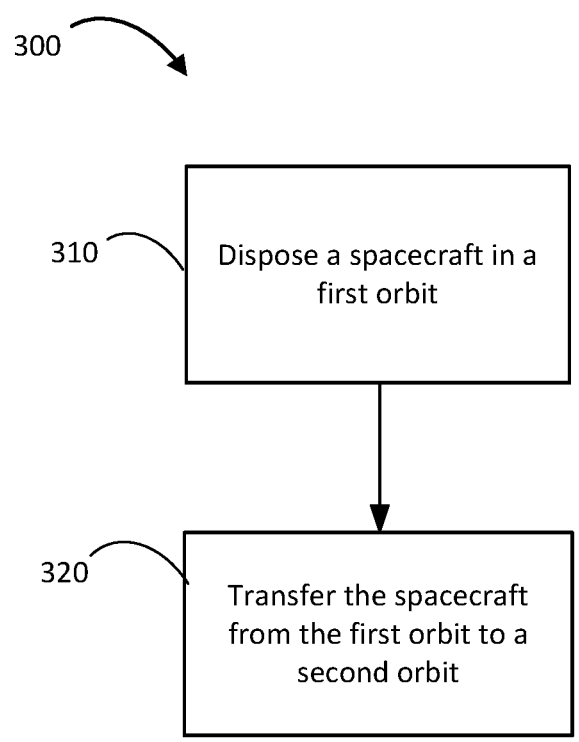
FIG. 3 illustrates a method of operating a deep space spacecraft.

FIG. 3 illustrates a method 300 of operating a deep space spacecraft. As described above, the spacecraft may include a power train that includes a solar array, an electric propulsion subsystem, and a power conversion module. The method may include disposing, at block 310, the spacecraft in a first orbit. While in the first orbit the spacecraft may be at an approximate average distance, $D_1$, from the sun.

The method may continue, at block 320, by transferring the spacecraft from the first orbit to a second orbit. While in the second orbit the spacecraft may be at an approximate average distance, $D_2$, from the sun, where $D_2$ differs from $D_1$ by at least 30% (i.e. $D_2 \geq 1.3 \times D_1$ or $D_1 \geq 1.3 \times D_2$). As indicated above, the power conversion module may receive power from the solar array at a voltage, $V_i$; and may deliver power to the electric propulsion subsystem at a voltage, $V_o$. The spacecraft may be configured to operate at a varying distance, D, from the sun within the range of $D_{min}$ to $D_{max}$, $D_{max}$ being at least $1.3 \times D_{min}$. The solar array may be configured to deliver power to the power conversion module at a voltage approximately equal to $V_o$ when the spacecraft is proximate to $D_{max}$.

In some implementations, $D_1$ is approximately equal to $D_{min}$ and $D_2$ is approximately equal to $D_{max}$. In some implementations, $D_1$ is approximately equal to $D_{max}$ and $D_2$ is approximately equal to $D_{min}$.

Thus, an improved spacecraft power train, operable over a wide range of distances from the sun, has been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft power train comprising:
a solar array;
an electric propulsion subsystem; and
a power conversion module that receives power from the solar array at an operating voltage, $V_i$; that varies with solar array temperature, and delivers power to the electric propulsion subsystem at a second voltage, $V_o$, wherein:
the spacecraft power train is configured to operate at a varying distance, D, from the sun within the range of $D_{min}$ to $D_{max}$, $D_{max}$ being at least $1.3 \times D_{min}$; and
the solar array is configured to deliver power to the power conversion module such that the value of $V_i$ is approximately equal to $V_o$, when the spacecraft is proximate to $D_{max}$.

2. The spacecraft power train of claim 1, wherein:
the electric propulsion subsystem is configured to operate with power regulated to $V_{nom}$+/−approximately 10%;
the solar array is configured to deliver power to the power conversion module such that $V_i$ varies, as a function of D, between a maximum of $V_o$ and a minimum less than $V_o/2$; and
the power conversion module is configured to deliver power to the electric propulsion subsystem at the voltage $V_o$, such that $V_o$ is not less than $V_{nom}/1.1$ and not greater than $1.1 \ast V_{nom}$.

3. The spacecraft power train of claim 2, wherein the solar array is configured to deliver power to the power conversion module at a voltage substantially less than $V_{nom}$ when the spacecraft is proximate to $D_{min}$.

4. The spacecraft power train of claim 1, wherein the power conversion module includes a boost converter with switching circuitry and an output diode.

5. The spacecraft power train of claim 4, wherein the switching circuitry of the boost converter becomes inactive and exhibits negligible power loss when $V_i \geq V_{nom}$.

6. The spacecraft power train of claim 1, wherein the power conversion module efficiency is about 99% when the solar array delivers power to the power conversion module at a voltage approximately equal to $V_o$.

7. The spacecraft power train of claim 1, wherein the power conversion module efficiency is about 99% when the spacecraft is at a distance from the sun of $0.9\,D_{max}$ or greater.

8. The spacecraft power train of claim 1, wherein the electric propulsion subsystem includes an electric thruster configured to operate at a power ranging between a minimum power $P_{min}$ and a maximum power $P_{max}$, $P_{max}$ being at least $5 \times P_{min}$.

9. A spacecraft comprising:
a power train that includes a solar array, an electric propulsion subsystem, and a power conversion module, wherein:
the power conversion module receives power from the solar array at an operating voltage, $V_i$; that varies with solar array temperature, and delivers power to the electric propulsion subsystem at a voltage, $V_o$;
the spacecraft is configured to operate at a varying distance, D, from the sun within the range of $D_{min}$ to $D_{max}$, $D_{max}$ being at least $1.3 \times D_{min}$; and
the solar array is configured to deliver power to the power conversion module such that the value of $V_i$ is approximately equal to $V_o$ when the spacecraft is proximate to $D_{max}$.

10. The spacecraft of claim 9, wherein:
the electric propulsion subsystem is configured to operate with power regulated to $V_{nom}$+/−approximately 10%;
the solar array is configured to deliver power to the power conversion module such that $V_i$ varies, as a function of D, between a maximum of $V_o$ and a minimum less than $V_o/2$; and
the power conversion module is configured to deliver power to the electric propulsion subsystem at the voltage $V_o$, such that $V_o$ is not less than $V_{nom}/1.1$ and not greater than $1.1 \ast V_{nom}$.

11. The spacecraft of claim 10, wherein the solar array is configured to deliver power to the power conversion module at a voltage substantially less than $V_{nom}$ when the spacecraft is proximate to $D_{min}$.

12. The spacecraft of claim 9, wherein the power conversion module includes a boost converter and an output diode.

13. The spacecraft power train of claim 9, wherein the electric propulsion subsystem includes an electric thruster configured to operate at a power ranging between a minimum power $P_{min}$ and a maximum power $P_{max}$, $P_{max}$ being at least $5 \times P_{min}$.

14. A method comprising:
disposing a spacecraft in a first orbit, the spacecraft while in the first orbit being at an approximate distance, $D_1$, from the sun;
transferring the spacecraft to a second orbit, the spacecraft while in the second orbit being at an approximate distance, $D_2$, from the sun, $D_2$ differing from $D_1$ by a least a factor of two; wherein,
the spacecraft includes a power train that includes a solar array, an electric propulsion subsystem, and a power conversion module;

the power conversion module receives power from the solar array at an operating voltage, $V_i$, that varies with solar array temperature, and delivers power to the electric propulsion subsystem at a voltage, $V_o$;

the spacecraft is configured to operate at a varying distance, D, from the sun within the range of $D_{min}$ to $D_{max}$, $D_{max}$ being at least $1.3 \times D_{min}$; and the solar array is configured to deliver power to the power conversion module such that the value of $V_i$ is approximately equal to $V_o$ when the spacecraft is proximate to $D_{max}$.

15. The method of claim 14, wherein:

the electric propulsion subsystem is configured to operate with power regulated to $V_{nom}$+/−approximately 10%;

the solar array is configured to deliver power to the power conversion module such that $V_i$ varies, as a function of D, between a maximum of $V_o$ and a minimum less than $V_o/2$; and the power conversion module is configured to deliver power to the electric propulsion subsystem at the voltage $V_o$, such that $V_o$ is not less than $V_{nom}/1.1$ and not greater than $1.1*V_{nom}$.

16. The method of claim 15, wherein the solar array is configured to deliver power to the power conversion module at a voltage substantially less than $V_{nom}$ when the spacecraft is proximate to $D_{min}$.

17. The method of claim 14, wherein the power conversion module includes a boost converter and an output diode.

18. The method of claim 14, wherein the electric propulsion subsystem includes an electric thruster configured to operate at a power ranging between a minimum power $P_{min}$ and a maximum power $P_{max}$, $P_{max}$ being at least $5 \times P_{min}$.

19. The method of claim 14, wherein $D_1$ is approximately equal to $D_{min}$ and $D_2$ is approximately equal to $D_{max}$.

20. The method of claim 14, wherein $D_1$ is approximately equal to $D_{max}$ and $D_2$ is approximately equal to $D_{min}$.

* * * * *